United States Patent [19]

Koppel

[11] Patent Number: 5,619,548
[45] Date of Patent: Apr. 8, 1997

[54] X-RAY THICKNESS GAUGE

[75] Inventor: Louis N. Koppel, Palo Alto, Calif.

[73] Assignee: Oryx Instruments and Materials Corp., Fremont, Calif.

[21] Appl. No.: 514,303

[22] Filed: Aug. 11, 1995

[51] Int. Cl.[6] ................................................ G21K 1/06
[52] U.S. Cl. .................................... 378/70; 378/84
[58] Field of Search ........................... 378/70, 71, 73, 378/84, 87, 86

[56] References Cited

U.S. PATENT DOCUMENTS

| | | | |
|---|---|---|---|
| 3,982,127 | 9/1976 | Hartmann et al. | 378/74 |
| 4,364,122 | 12/1982 | Wolfel et al. | 378/73 |
| 5,003,569 | 3/1991 | Okada et al. | 378/70 |
| 5,291,269 | 3/1994 | Ledger | 356/355 |
| 5,293,214 | 3/1994 | Ledger | 356/355 |

FOREIGN PATENT DOCUMENTS 58-28655  2/1983  Japan ........................ 378/70

OTHER PUBLICATIONS

T. C. Huang and W. Parrish, "Characterization of Single–and Multiple–Layer Films by X–Ray Reflectometry", *Advances in X–Ray Analysis*, vol. 35, pp. 137–142 (1992).

Louis N. Koppel, "Direct X–Ray Response of Self–Scanning Photodiode Arrays", *Advances in X–Ray Analysis*, vol. 19, pp. 587–596 (1975).

R. A. Cowley and T. W. Ryan, "X–ray scattering studies of thin films and surfaces: thermal oxides on silicon", *J. Phys.D*, vol. 20, pp. 61–68 (1987).

*Primary Examiner*—Don Wong
*Attorney, Agent, or Firm*—Thomas Schneck

[57] ABSTRACT

A monochromator positioned in the path of a plurality of X-rays to simultaneously impinge the plurality of X-rays onto a thin-film at various angles of incidence, typically greater than a critical angle $\psi_c$. The monochromator may be cylindrically or toroidally shaped, defining two focal areas with a source of X-rays positioned at the first focal point and a sample containing the thin-film layer positioned at the second focal point. A position sensitive detector is positioned to sense monochromatic X-rays reflected from the thin-film and produce a signal corresponding to both intensity and an angle of reflection of the monochromatic X-rays sensed. A processor is connected to receive signals produced by the detector to determine, as a function of intensity and angle of reflection of the monochromatic X-rays impinging on the detector, various properties of the structure of the thin-film layer, including the thickness, density and smoothness.

31 Claims, 4 Drawing Sheets

5,619,548

X-RAY THICKNESS GAUGE

TECHNICAL FIELD

The present invention pertains to the field of non-destructive measurement of properties of the structure of various planar materials, such as thin-films disposed on substrates. Specifically, the present invention pertains to a small angle X-ray scattering and data collection device to measure the thickness, density and smoothness of thin-films on substrates.

BACKGROUND ART

Thin-films have been widely used to fabricate various electronic, optical and magnetic structures because the processing of the thin-films may be precisely controlled, allowing the manufacture of complex components. These films are typically thermally grown or deposited from a vapor phase. Often the films are formed from metals, semiconductors or insulators, and must satisfy rigorous chemical, structural and electrical requirements. In addition, film composition and thickness must be strictly controlled to facilitate etching of sub-micron features. Hence, there is a great need to monitor thin-film structures during the manufacturing process to ensure they adhere to specified parameters.

Originally, the thickness of thin-film structures was measured using a stylus instrument. Use of a stylus, however, entailed contact with the thin-film surface, often resulting in damage which proved particularly unsuitable for use with soft materials. Ellipsometry was also employed to measure thin-film thicknesses to avoid the destructive contact of the stylus.

U.S. Pat. Nos. 5,293,214 and 5,291,269 to Ledger each discloses a device for measuring thin-film thickness employing reflectometry. These devices include a source directing light onto a condensing lens and subsequently through an aperture to illuminate a silicon wafer having a thin-film disposed on it. Light reflected from the thin-film is collected by a CCD array. The reflected light contains an image of an interference fringe pattern that is formed by constructive interference of light reflected from the physical boundaries within the wafer. The light collected by the CCD array is converted to a map of measured reflectance data by a digitizing circuit and a computer. The data is then compared to reference reflected data to generate a map of the thin-film layer thickness over a full aperture of the wafer.

The drawback with relying on ellipsometry or reflectometry is that it is inaccurate unless the optical properties of the film are known, e.g., absorbance and index of refraction. In addition to the aforementioned drawbacks, the optical measuring techniques of the prior art are unsuitable for measuring opaque thin-films. This results from the prior art techniques relying on the observance of light reflected from a subsurface thin-film substrate interface. Small angle X-ray scattering has, however, proved useful in measuring opaque thin-films due to the penetrability of the relatively short wavelength. Cowley and Ryan show that structural properties of thin films, such as thickness, density and smoothness, may be determined by analyzing the intensity of interference fringes formed by X-rays reflected from a thin-film structure at various angles. See R. A. Cowley and T. W. Ryan, "X-ray scattering studies of thin films and surfaces: thermal oxides on silicon", *J. Phys. D*, vol. 20 (1987). Specifically, Cowley and Ryan showed that the angular distance between the fringes is an accurate measure of the thin-film's thickness; the intensity of the fringes corresponds to thin-film density, relative to the density of the substrate; and the change of intensity with respect to the change of reflection angle corresponds to the smoothness of the thin-film/air interface and the thin-film/substrate interface.

FIG. 1 shows a prior art device similar to that used by Cowley and Ryan including a source 11 producing a bundle of X-rays 13 directed onto a planar monochromator 15. X-rays 17 reflected from the monochromator 15 are monochromatic and directed onto a thin-film 19 deposited on a substrate 21. An X-ray detector 23 is positioned to collect X-rays 25 reflected from the thin-film 19. In order to collect the rays reflected from the surface at various angles of incidence θ, the substrate 21 is placed upon a stage 27 capable of pivoting about an axis 29 extending perpendicular to both the plane of the substrate and the direction of travel of the X-rays.

U.S. Pat. No. 5,003,569 to Okada et al. discloses a method and an apparatus using X-rays to determine a thickness of organic films. An organic film is irradiated with X-rays produced by a source, and a detector is positioned to collect X-rays reflecting from the sample's surface. The irradiation angle is continuously changed by moving the source of X-rays with respect to the organic film. The detector is moved accordingly to collect the X-rays reflected from the film at different irradiation angles. A drawback with the aforementioned X-ray scattering detection devices is that consecutive measurements must be made to obtain measurements at various angles of incidence, greatly increasing the time necessary to analyze the thin-film structure.

It is an object, therefore, of the present invention to decrease the time required to measure the structure of a thin-film layer by concurrently impinging x-rays on a thin-film surface at various angles and concurrently detecting X-rays reflected from the thin-film.

SUMMARY OF THE INVENTION

This object has been achieved by having a cylindrical monochromator positioned in the path of a plurality of X-rays to concurrently impinge the plurality of X-rays onto a thin-film at various angles of incidence, typically greater than a critical angle $\psi_c$. The monochromator defines two focal areas, typically a point focus and a line focus. A source of X-rays positioned at the point focus and a sample containing the thin-film layer is positioned at the line focus. A source of X-rays directs a plurality of X-rays onto the monochromator, with the X-rays reflected therefrom being monochromatic. A position sensitive detector is positioned to sense monochromatic X-rays reflected from the thin-film and produce a signal corresponding to both intensity and an angle of reflection of the monochromatic X-rays sensed. A processor is connected to receive signals produced by the detector to determine, as a function of intensity and angle of reflection of the monochromatic X-rays impinging on the detector, various properties of the structure of the thin-film layer, including the thickness, density and smoothness.

BEST MODE FOR CARRYING OUT THE INVENTION

Figure 1:
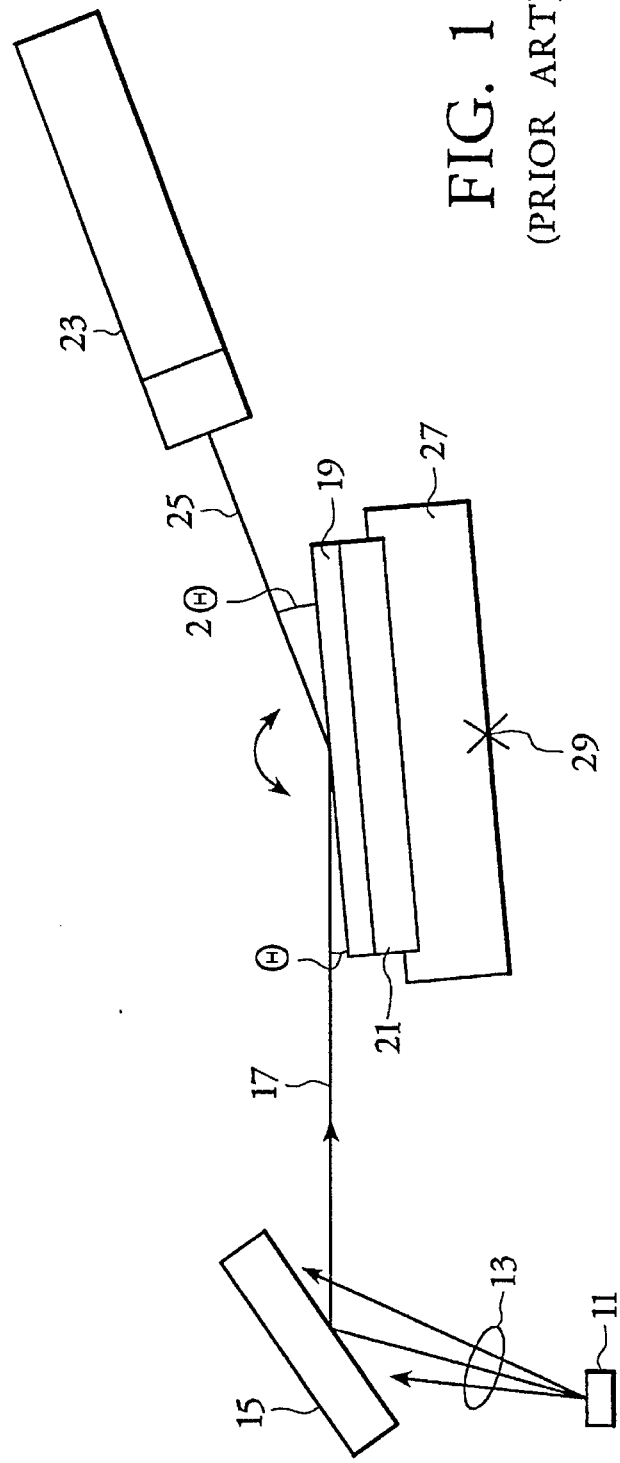
FIG. 1 is a simplified plan view of a prior art thin-film thickness measuring system employing X-ray scattering.
Figure 2:
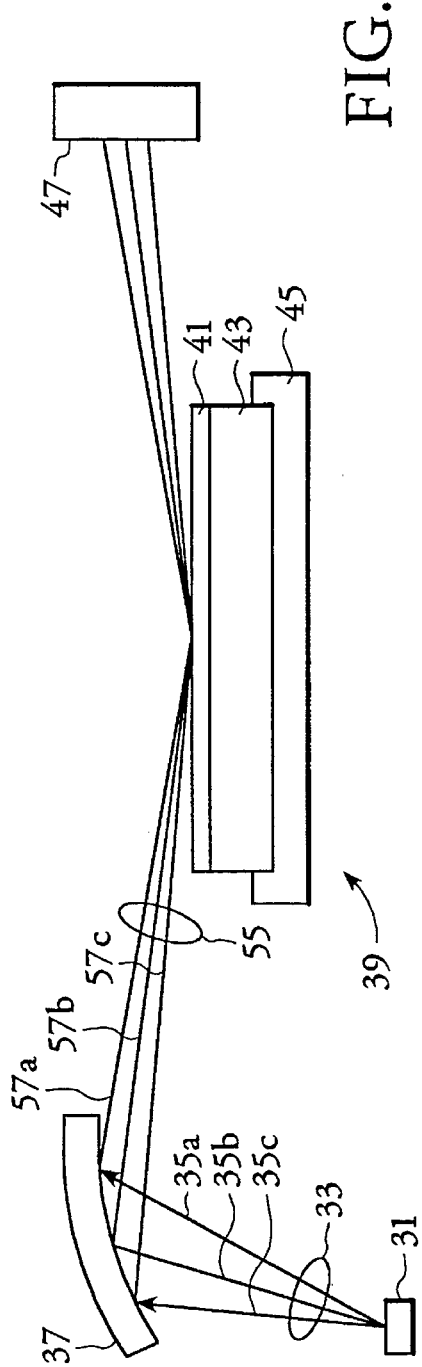
FIG. 2 is a simplified plan view of a thin-film structural analysis system in accord with the present invention.

Referring to FIG. 2, an X-ray scattering system for measuring thin-film structures in accord with the present invention includes an X-ray source 31 producing an X-ray bundle 33 that comprises of a plurality of X-rays shown as 35a, 35b and 35c. An X-ray reflector/reflecting surface 37 is placed in the path of the X-ray bundle 33. The reflector 37 directs the X-ray bundle 33 onto a test sample 39, typically including a thin-film layer 41 disposed on a substrate 43, held in a fixed position by a stage 45. A detector 47 is positioned to sense X-rays reflected/scattered from the test sample 39 and produce signals corresponding to the intensity and an angle of reflection of the X-rays sensed.

Figure 3:
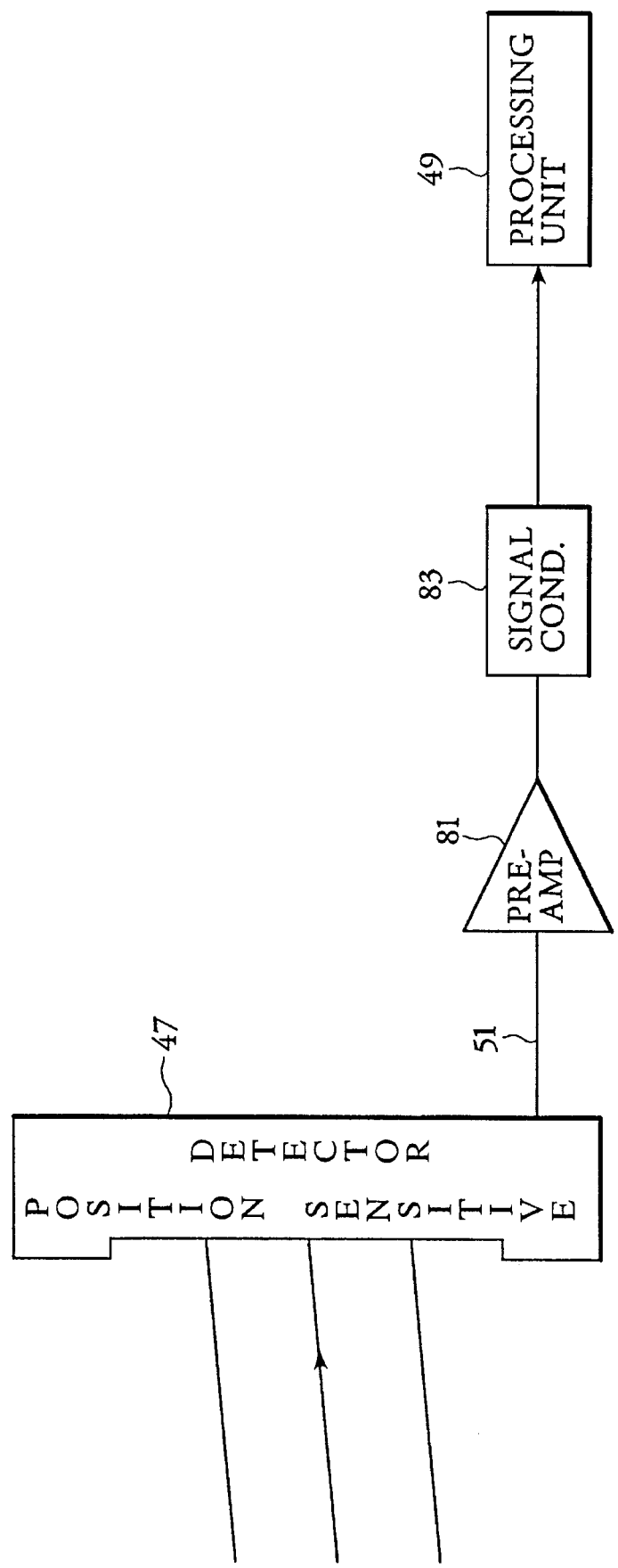
FIG. 3 is a detailed schematic view of the electronics for conditioning signals received from a detector shown in FIG. 2.

Referring also to FIG. 3, information corresponding to the intensity and the angle of reflection of the X-rays is received from the detector 47 by a processing unit 49 along line 51. X-ray source 31 may be an electron-impact X-ray tube, a high temperature plasma or a synchrotron accelerator. It is preferred, however, that the X-ray source 31 be a X-ray tube with a chromium anode such as the Rigaku 1.2 kW, 60 kV rotating x-ray tube. This type of x-ray tube typically produces an x-ray having a wavelength of 2.3 angstroms.

To facilitate small-angle intensity measurements, some degree of monochromatization of the X-rays incident on the sample is necessary, particularly if the X-ray source 31 is a synchrotron accelerator. To that end, the X-ray reflector/reflecting surface 37 is typically a monochromator, defining two focal areas. The monochromator may be shaped as a toroid or an ellipsoid, each defining two focal points, or a cylindrical shape, defining a point focus and a line focus. It is preferred, however, that a Huber quartz J-G cylindrically curved single-crystal monochromator be employed and configured to satisfy the Guinier conditions. The diffraction of the incident bundle 33 of X-rays within the single-crystal monochromator isolates a narrow band of the spectrum when the Bragg condition for a particular wavelength is satisfied. The diffraction produces a monochromatic bundle 55 of X-rays, shown as 57a, 57b and 57c, which are directed onto the test sample 39. The monochromator is considered curved because the monochromator is cylindrically shaped. As the monochromator satisfies the Guinier conditions, the focal areas need not be equally spaced from the monochromator. It is preferred, however, that X-ray source 31 be positioned proximate to the point focus twelve centimeters from the monochromator 37, so that a maximum flux of X-rays produced by the source 31 impinge on the monochromator. Typically, all the X-rays produced by the source impinge on the monochromator. This greatly improves the X-ray flux directed toward the sample surface 39. The test sample 39 is positioned proximate to the line focus twenty-one centimeters from the monochromator 37.

Figure 4:
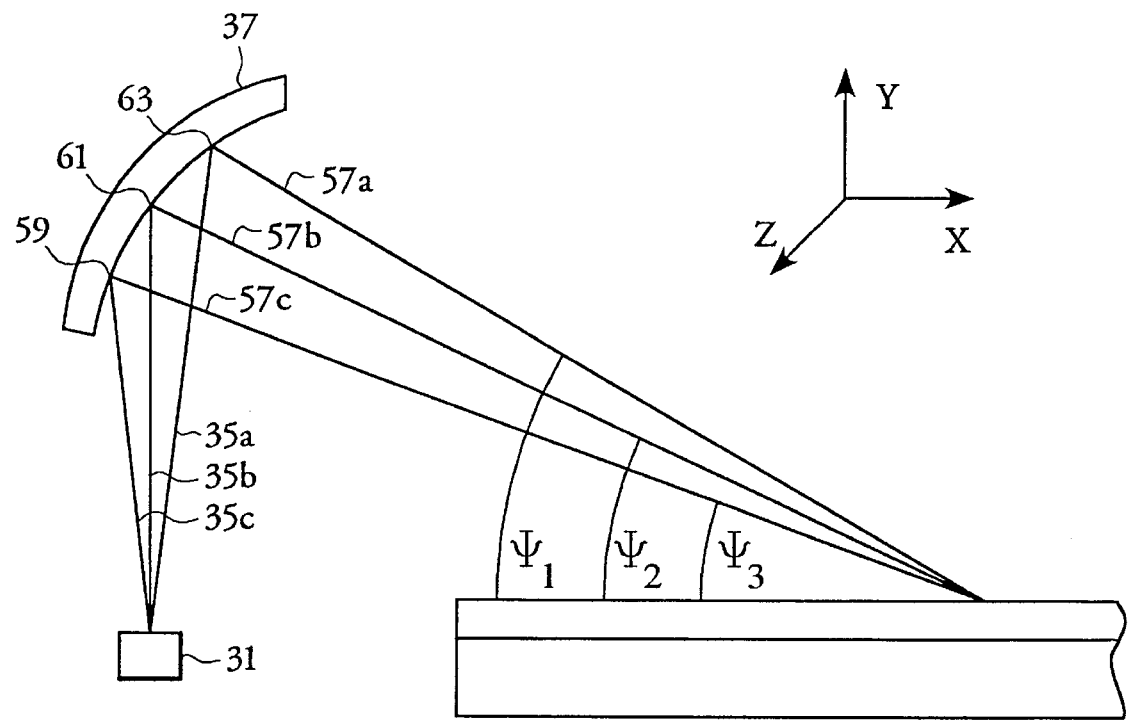
FIG. 4 is a schematic view depicting the focusing geometry of a monochromator shown in FIG. 2, in accord with the present invention.

Referring to FIG. 4, the X-rays 35a, 35b and 35c, forming the incident bundle 33, diverge from the X-ray source 11 to simultaneously impinge upon the curved monochromator 37 at different spatial positions 59, 61 and 63, along the y axis. The monochromatic X-rays 57a, 57b and 57c produced by the curved monochromator 37 corresponding to incident X-rays 35a, 35b and 35c, respectively. The monochromatic X-rays 57a, 57b and 57c are directed to focus on a line in the x-z plane. Due to the X-rays 35a, 35b and 35c impinging on the monochromator at different spatial positions, the monochromator directs X-rays 57a, 57b and 57c to simultaneously impinge upon the thin-film layer 41 of the test sample 39 at differing angles of incidence, shown as $\psi_1$, $\psi_2$ and $\psi_3$, respectively. Typically all the incident angles, shown as $\psi_1$, $\psi_2$ and $\psi_3$, of X-rays are greater than a critical angle, $\psi_c$. The critical angle $\psi_c$ is approximated as follows:

$$\psi_c = 0.203 \, \rho^{1/2}/\text{hu}$$

where $\psi_c$ is defined in terms of radians, $\rho$ is the mass density of substrate 43 in units grams/cubic centimeter and hu is the X-ray energy in units of keV. It is critical that the X-rays are incident on the test sample 39 at angles greater than $\psi_c$ to produce interference fringes upon reflection, discussed more fully below with respect to FIG. 5.

Figure 5:
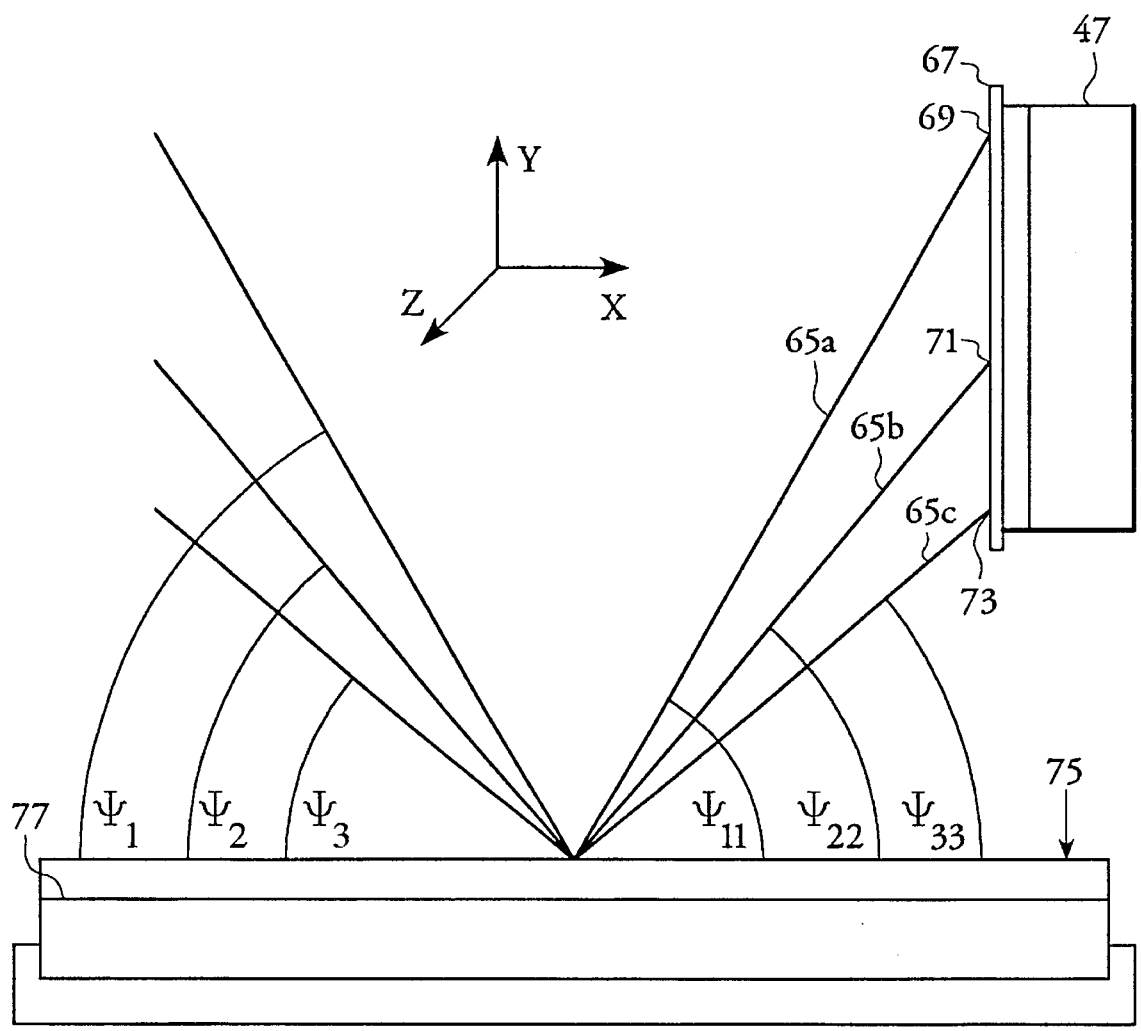
FIG. 5 is a schematic side view depicting the reflection geometry of a test sample shown in FIGS. 2 and 4.

Referring also to FIG. 5, X-rays 65a, 65b and 65c reflected from the test sample 39 are shown corresponding to monochromatic X-rays 57a, 57b and 57c, respectively. The reflected rays 65a, 65b and 65c result from constructive and destructive interference of X-rays reflecting from thin-film surface 75 and thin-film/substrate interface 77. It can be seen that the angle of reflection $\psi_{11}$, $\psi_{22}$ and $\psi_{33}$, correspond to X-rays 65a, 65b and 65c, respectively. The function between the angles of incidence and the angles of reflection is linear and can be described as follows:

$$\psi_{11} = \psi_1$$

$$\psi_{22} = \psi_2$$

$$\psi_{33} = \psi_3$$

Given that the reflected X-rays 65a, 65b and 65c reflect from the test sample 39 at differing angles of reflection, the beams diverge with respect to one another and may be spatially resolved along the y axis, in a detector plane located transverse to the plane of the test sample 39. In this manner, X-rays, shown as 65a, 65b and 65c, will impinge upon the detector plane 67 at points 69, 71 and 73, respectively. Thus, it can be seen that X-rays impinging in the detector plane 67 can be identified as being uniquely associated with a particular angle of incidence.

To take advantage of these properties, typically detector 47 is a position sensitive detector capable of resolving the X-rays reflecting from the test sample 39 along the one axis. Although FIG. 5 shows spatially resolving the X-rays along the y axis, both the detector 47 and monochromator may be rotated so that resolution is obtained along the x or z axis, as well. Any position sensitive detector may be employed, for example, photographic film. The preferred detector, however, is a solid-state device such as a Reticon R12048S self-scanning photo-diode array (SSPA) positioned at the detecting plane 67. L. N. Koppel, in "Direct X-Ray Response of Self-Scanning Photodiode Arrays", *Advances in X-Ray Analysis*, vol. 19 (1975), describes the implementation of SSPAs to measure the spatial distribution of X-rays. Also, a linear or area-sensitive charged-coupled device, a multiple-anode microchannel plate detector, or a photo-stimulated storage phosphor image detector may be employed in place of an SSPA.

The detector 47 is positioned to receive a maximum flux of X-rays, as shown by 65a, 65b and 65c, reflected from the test sample 39. Typically, the detector 47 is positioned to receive all of the X-rays reflected from the test sample 34. The X-rays impinging at points 69, 71 and 73 are resolved as interference fringes resulting from constructive and destructive interference of X-rays reflected from the top surface 75 of the thin-film 34 and from the thin-film substrate interface 77. The detector 47 produces signals which are subsequently digitized and analyzed by circuitry associated with the detector 47.

Figure 6:
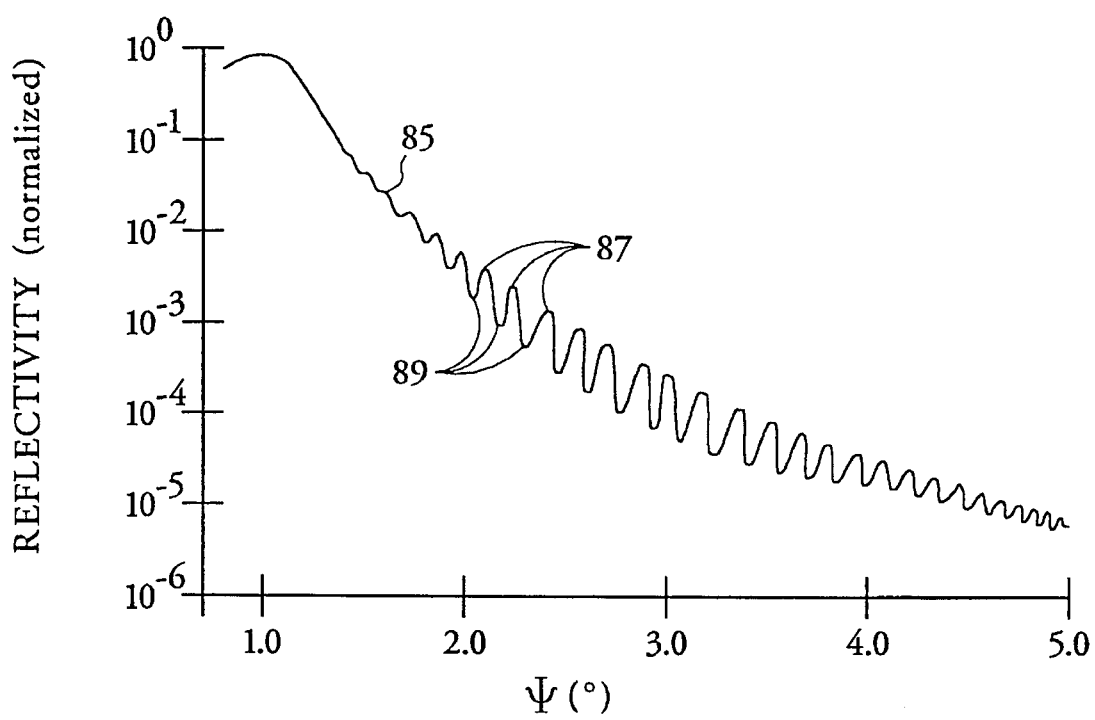
FIG. 6 is a graph depicting the reflectivity (R) versus angle of reflection ($\psi$) in accord with the present invention.

Referring again to FIG. 3, the electronic circuitry associated with the detector 47 is shown generally as preamplifier 81 and signal conditioning circuit 83. The electronic circuitry amplifies the signals from the detector 47, shapes the signal into energy proportional voltage pulses and selects the pulses corresponding to the desired photon energy, thereby suppressing noise and polychromatic radiation. The pulses are digitized and fed into the processor 49 which determines a reflectivity curve that may be depicted logarithmically as reflectivity (R) versus reflection angle ($\psi$). The information determined by the processor may be stored on a magnetic media or it may be visualized on an analyzer, as shown by curve 85 in FIG. 6. The reflectivity curve 85 may be analyzed employing the least-squares refinement described by T. C. Huang and W. Parrish in "Characterization of Single- and Multiple-Layer", *Advances in X-Ray Analysis*, vol. 35, pp. 137–142 (1992) to determine a plurality of properties concerning the thin-film layer. As discussed by Huang and Parrish, the maxima 87 and/or minima 89 of the interference fringes are related to the thickness of the thin-film by the modified Bragg equation as follows:

$$\sin\psi_i^2 = \psi_c^2 = (n_i + \Delta n^2)\lambda^2 4 t^2$$

where $\psi_i$ is the angle for the maximum or the minimum of the ith interference fringe, $\psi_c$ is the critical angle for total reflection, $n_i$ is an integer, and $\Delta n$ equals ½ or 0 for a maximum and minimum, respectively. t is the thickness of the thin-film layer and $\lambda$ is the wavelength of the X-rays. From the data concerning the thickness, Huang and Parrish continue to describe how the density of the thin-film layer can be determined, as well as the smoothness of the thin-film surface and the thin-film substrate interface, mentioned above.

With the above-described features of the claimed invention, a plurality of properties of a thin-film layer on a substrate may be simultaneously determined, including the thickness, density and smoothness of both the thin-film surface and the thin-film/substrate interface.

I claim:

1. A device for measuring properties of a thin-film disposed on a layered structure using scattering X-rays, said device comprising:

a source adapted to produce X-rays;

a curved surface positioned between said source and said thin-film, with the surface being in fixed orientation with respect to the layered structure and adapted to focus the X-rays onto a first focal area of the layered structure with one point of said area having X-rays impinging thereon at varying angles of incidence, with a reflected X-ray being associated with each of said plurality of X-rays;

a detector positioned to sense said reflected X-rays, said detector adapted to produce a signal corresponding to an angle of reflection and an intensity of each of the reflected X-rays sensed; and a processor means, connected to receive signals produced by the detector, for determining properties of the thin-film based upon a comparison of the intensity and the angle of reflection of the reflected X-rays sensed, the properties including thin-film thickness.

2. The device of claim 1 wherein the reflecting surface is a curved reflector.

3. The device of claim 1 wherein the reflecting surface is a curved monochromator.

4. The device of claim 1 wherein the reflecting surface is a curved monochromator having an ellipsoidal shape.

5. The device of claim 1 wherein the reflecting surface has a cylindrical shape, defining a second focal area, with the source positioned at the second focal area.

6. The device of claim 1 wherein the reflecting surface has a toroidal shape, defining a second focal area, with the source positioned at the second focal area.

7. The device of claim 1 wherein the detector is in a fixed rotational relationship with respect to said layered structure.

8. The device of claim 5 wherein the detector is a self-scanning diode array.

9. The device of claim 5 wherein the detector is a charge coupled device.

10. The device of claim 5 wherein the detector is a multiple-wire proportional counter.

11. The device of claim 5 wherein the detector is a multiple-anode microchannel detector.

12. The device of claim 5 wherein the detector is a photostimulated storage phosphor image detector.

13. The device of claim 5 wherein the varying angles of incidence are greater than a critical angle $\psi_c$.

14. A device for measuring the structure of a thin-film disposed on a substrate, comprising:

an X-ray reflector defining a focal area proximate to the thin-film;

a source directing a plurality of X-rays onto the reflector, with the reflector directing the plurality of X-rays as a bundle of monochromatic X-rays onto said thin-film at a plurality of incident angles greater than the critical angle ($\psi_c$), with each of the monochromatic X-rays reflecting from the thin-film at an angle of reflection corresponding to an angle of incidence, the reflector being a curved monochromator defining at least one focal point proximate to the substrate, whereby the curved monochromator simultaneously directs the plurality of X-rays onto the thin-film at varying angles of incidence;

a detector positioned to sense X-rays reflected from the thin-film along a plane transverse to the plane of the thin-film, the detector producing a signal corresponding to an intensity and a spatial position of the transverse X-ray in the plane, with each spatial position in the plane corresponding to an angle of reflection; and a processor means connected to receive signals produced by the detector for determining physical properties of the thin-film based upon all signals received by the detector, the physical properties including the mass per unit area of the thin-film.

15. The device of claim 14 wherein the reflector has a cylindrical shape defining a second focal area, with the source positioned at the second focal area with said first focal area corresponding to a line lying in the plane of the thin-film.

16. The device of claim 14 wherein the reflector has a toroidal shape defining a second focal point, with the source positioned at the second focal point.

17. The device of claim 14 wherein the detector is positioned to sense X-rays reflected from the thin-film along a plane transverse to the plane of the thin-film, the detector further including means for producing a signal corresponding to both intensity and a spatial position of the X-ray in the plane.

18. The device of claim 16 wherein the detector is a self-scanning diode array.

19. The device of claim 16 wherein the detector is a charge coupled device.

20. The device of claim 16 wherein the detector is a self-scanning diode array.

21. The device of claim 16 wherein the detector is a charge coupled device.

22. The device of claim 16 wherein the detector is a multiple-wire proportional counter.

23. A device for measuring the properties of a thin-film disposed on a substrate, defining a substrate-thin-film interface, comprising:

a source of X-rays adapted to produce X-rays;

an X-ray reflector positioned in the path of the X-rays and adapted to simultaneously impinge onto at least one point of the thin-film a plurality of said X-rays at a plurality of incident angles with each of the plurality of X-rays reflecting from the thin-film at an angle of reflection, defining reflected X-rays with the angle of reflection corresponding to an angle of incidence;

a detector positioned to sense said reflected X-rays reflected from the thin-film and produce a signal corresponding to the intensity and an angle of reflection of the reflected X-rays sensed; and a processor means connected to receive signals produced by the detector for determining properties of the thin-film based upon a comparison of the intensity and the angle of reflection of the reflected X-rays sensed, the properties including thin-film thickness, thin-film density and a relative smoothness between the surface of the thin-film and the smoothness of the substrate-thin-film interface.

24. The device of claim 23 wherein said detector and said interface are in a fixed rotational relationship with respect to each other.

25. The device of claim 23 wherein the monochromator is ellipsoidal defining first and second focal points, with the source positioned at the first focal point and the second focal point laying in the plane of the thin-film.

26. The device of claim 23 wherein the detector is positioned to sense monochromatic X-rays reflected from the thin-film along a plane transverse to the plane of the thin-film, the detector further including means for producing a signal corresponding to both intensity and a spatial position of the monochromatic X-ray in the plane.

27. The device of claim 26 wherein the detector is a self-scanning diode array.

28. The device of claim 26 wherein the detector is a charge coupled device.

29. The device of claim 26 wherein the detector is a self-scanning diode array.

30. The device of claim 26 wherein the detector is a charge coupled device.

31. The device of claim 26 wherein the detector is a multiple-wire proportional counter.

* * * * *

UNITED STATES PATENT AND TRADEMARK OFFICE
CERTIFICATE OF CORRECTION

PATENT NO. : 5,619,548
DATED : Apr. 8, 1997
INVENTOR(S) : Louis N. Koppel

It is certified that error appears in the above-indentified patent and that said Letters Patent is hereby corrected as shown below:

Col. 4, line 13, "$\Psi_c=0.203\rho^{1/2}/h\cup$" should read -- $\Psi_c=0.203\rho^{1/2}/hu$ --.

Claim 1, col. 5, line 56, "a curved surface" should read -- a curved reflecting surface --.

Claim 1, col. 5, line 60, "area having X-rays" should read -- area having a plurality of X-rays --.

Claim 14, col. 6, lines 50-51, "spatial position of the transverse X-ray" should read -- spatial position of the X-ray --.

Claim 25, col. 8, line 10, "monochromator" should read -- reflector --.

Signed and Sealed this

Sixteenth Day of September, 1997

Attest:

BRUCE LEHMAN

*Attesting Officer*         *Commissioner of Patents and Trademarks*